United States Patent [19]

Drori

[11] Patent Number: 4,681,681
[45] Date of Patent: Jul. 21, 1987

[54] GROOVED FILTER DISCS

[76] Inventor: Mordeki Drori, 89 Zahal Street, Kiron, Israel

[21] Appl. No.: 623,353

[22] Filed: Jun. 22, 1984

[30] Foreign Application Priority Data

Jul. 1, 1983 [IL] Israel ........................................ 69145

[51] Int. Cl.[4] .............................................. B01D 29/46
[52] U.S. Cl. ...................... 210/133; 210/135; 210/238; 210/420; 210/451; 210/488; 210/498
[58] Field of Search ............... 210/130, 133, 135, 232, 210/237, 238, 323.1, 323.2, 330, 331, 339, 341, 345, 346, 347, 451, 470, 498, 471, 488, 477, 420; 137/329.1, 329.2, 329.4

[56] References Cited

U.S. PATENT DOCUMENTS

| 1,642,864 | 9/1927 | Williams | 210/488 |
|---|---|---|---|
| 1,768,350 | 6/1930 | Chase | 210/488 |
| 2,137,556 | 11/1938 | Young | 210/488 |
| 2,459,318 | 1/1949 | Hallinan | 210/314 |
| 2,465,579 | 3/1949 | Eduards | 210/488 |
| 2,572,971 | 10/1951 | Bauer | 210/130 |
| 2,751,085 | 6/1956 | Bowers et al. | 210/488 |
| 2,772,001 | 11/1956 | Bowers | 210/488 |
| 2,856,076 | 10/1958 | Whipple | 210/488 |
| 2,921,686 | 1/1960 | Forman et al. | 210/345 |
| 3,065,702 | 11/1962 | Dick | 210/130 |
| 3,152,988 | 10/1964 | Gutkowski et al. | 210/488 |
| 3,229,816 | 1/1966 | Rosaen | 210/130 |
| 3,273,374 | 9/1966 | Annett | 210/488 |
| 3,543,935 | 12/1970 | Detrick | 210/130 |
| 3,777,889 | 12/1973 | Henderson | 210/135 |
| 4,051,031 | 9/1977 | Suzuki | 210/133 |
| 4,105,562 | 8/1978 | Kaplan et al. | 210/323.1 |
| 4,120,794 | 10/1978 | Taylor | 210/345 |
| 4,295,963 | 10/1981 | Drori | 210/108 |
| 4,419,234 | 12/1983 | Miller et al. | 210/232 |
| 4,427,547 | 1/1984 | Miller et al. | 210/488 |
| 4,478,618 | 10/1984 | Bly et al. | 210/323.2 |
| 4,572,784 | 2/1986 | Drori | 210/488 |

FOREIGN PATENT DOCUMENTS 642937 9/1950 United Kingdom ............... 210/488

Primary Examiner—Richard V. Fisher
Assistant Examiner—Wanda L. Millard
Attorney, Agent, or Firm—Benjamin J. Barish

[57] ABSTRACT

A filter comprises a housing and a filter body including a plurality of grooved filter discs supported in stacked relation on a plurality of rods extending longitudinally of the housing, the rods being supported at their opposite ends by the housing and being disposed in an array around the housing longitudinal axis with spaces between the rods to provide large passageways for the flow of the fluid. The filter further includes a stack-—removing member disposed at one end of the filter discs, and a handle to facilitate drawing the filter discs out of the housing, when opened for cleaning purposes, without breaking the stack.

15 Claims, 5 Drawing Figures

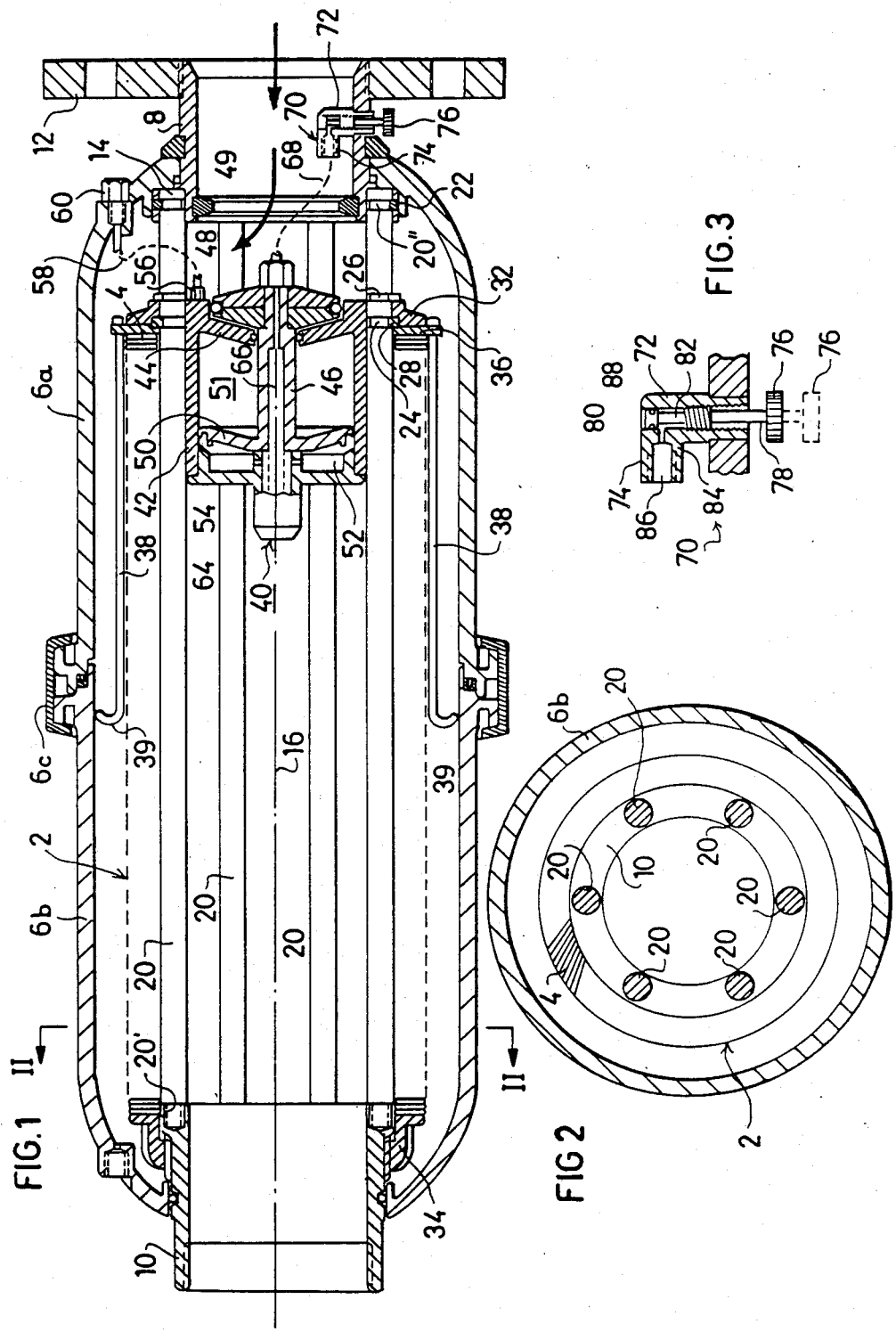

GROOVED FILTER DISCS

BACKGROUND OF THE INVENTION

The present invention relates to filters such as are used in water irrigation systems for removing solid particles from the irrigating water to prevent clogging of drip emitters, sprinklers, or other irrigating devices. The invention is particularly useful with respect to the type of filter in which the filter body is in the form of a plurality of grooved filter discs supported in stacked relation such as described in my prior U.S. Pat. No. 3,789,990, and is therefore described below with respect to this type of filter.

An object of the present invention is to provide a number of improvements to filters in general, and particularly to the multiple disc type of filter.

BRIEF SUMMARY OF THE PRESENT INVENTION

According to one broad aspect of the present invention, there is provided a filter comprising a housing having an inlet and an outlet, and a filter body disposed within the housing for filtering the fluid flowing therethrough from the inlet to the outlet, characterized in that the filter body includes a plurality of grooved filter discs supported in a stack on a plurality of individual rods extending longitudinally of the housing, the rods being supported at their opposite ends by the housing and being disposed in an array around the housing longitudinal axis with spaces between the rods to provide large passageways for the flow of the fluid. Each of the grooved filter discs is formed with an opening of a diameter at least as large as the outer diameter of the array of rods for supporting the discs in stack form on the rod array. Such construction has been found to greatly simplify not only the manufacture of filters of this type, but also their assembly and cleaning.

According to another aspect of the invention, the filter may include a valve assembly mounted to and within the rods and spaced inwardly of the inlet end thereof and of the housing, the valve assembly comprising a valve member movable either to a first position directing the fluid to flow through the spaces between the inlet ends of the rods to the outer face of the filter body and then inwardly through the filter body, or to a second position closing the inlet end of the housing and thereby terminating the fluid flow therethrough. Such construction, which enables the incorporation of a control valve into the filter with little additional cost, obviates the need for a separate valve assembly to control the flow of the fluid through the filter.

According to a further aspect of the invention, the filter body includes a plurality of grooved filter discs supported in stacked relation, and the filter further includes a stack-removing member such as a circular ring, disposed at one end of the stack of filter disc, and a handle secured to the stack-removing member to facilitate drawing the filter discs out of the filter housing when opened for cleaning purposes, without breaking the stack. Such arrangement minimizes the possibility of breaking the stack when the discs are removed for cleaning purposes, which could cause foreign particles to separate from the discs and clog the irrigation devices when flow is resumed through the housing.

In a second described embodiment, the inlet end of the housing includes shaped deflector surfaces imparting a cyclonic effect to the fluid flowing therethrough to the filter body. In that embodiment, the shaped deflector surfaces are formed in sleeves serving as sockets for receiving one end of the rods.

According to a further feature of the latter described embodiment, the handle of the stack-removing member is disposed inwardly of the filter discs.

Further features and advantages of the invention will be apparent from the description below:

The invention is herein described, by way of example only, with reference to the accompanying drawings, wherein:

FIG. 1 is a longitudinal sectional view illustrating one form of filter constructed in accordance with the present invention;

FIG. 2 is a transverse sectional view along lines II—II of FIG. 1;

FIG. 3 is an enlarged fragmentary view better illustrating the construction of the manual pilot valve for controlling the main valve within the filter of FIG. 1;

DESCRIPTION OF TWO PREFERRED EMBODIMENTS

Figure 4:
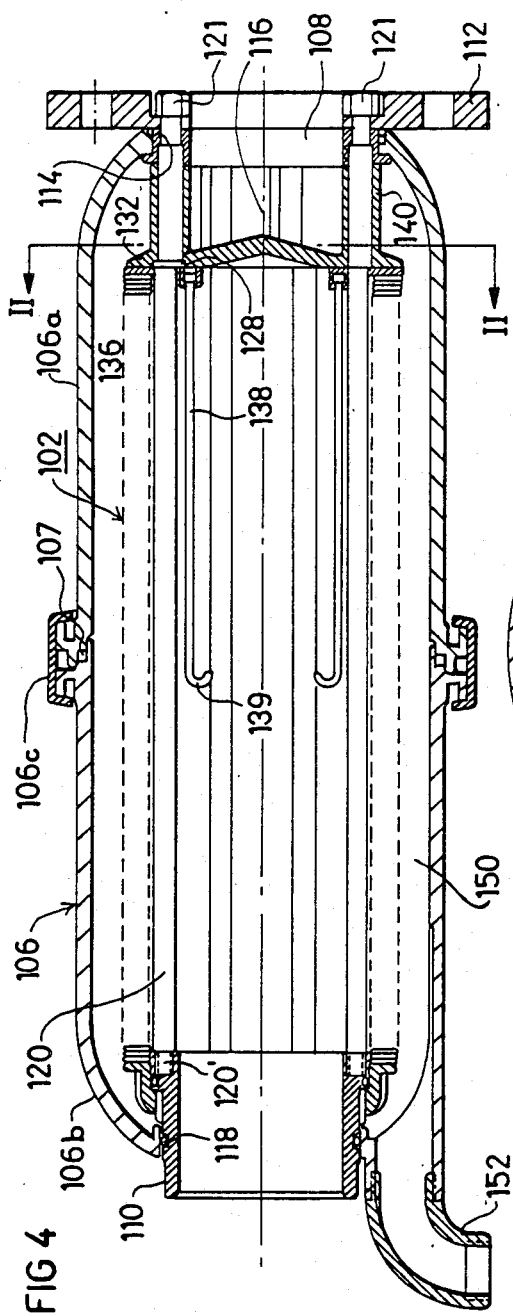
FIG. 4 is a longitudinal sectional view of another form of filter constructed in accordance with the present invention.

The filter illustrated in FIGS. 1–3 of the drawings is an in-line filter of the general type described in my U.S. Pat. No. 3,789,990. It includes a filter body, generally designated 2, constituted of a plurality of grooved filter discs 4 supported in stacked relation within a filter housing, generally designated 6. Housing 6 includes two half-sections 6a, 6b, of generally the same cylindrical configuration, joined together at their inner ends by an annular ring 6c having a seal 7 between them. The outer end of section 6 serves as the inlet to the filter and receives an inlet tube 8 having an abutment ring 9 engaging the end of the housing section; and the outer end of section 6b serves as the outlet from the filter and receives an outlet tube 10. If desired, the housing inlet tube 8 may threadedly receive a flange plate 12 for mounting the filter to a suitable support.

The inner face of housing section 6a at the inlet end of the filter is formed with six circular recesses defining individual sockets 14 disposed in a circular array around the longitudinal axis 16 of the filter, which sockets border the opening of section 6a receiving the housing inlet tube 8. A similar circular array of recesses defining individual sockets 18 is formed at the opposite end of the filter housing, in this case in housing outlet tube 10.

The two circular arrays of recesses or sockets 14 and 18 are used for mounting the opposite ends of six rods 20. Steel rods 20 are of cylindrical section and their cylindrical ends are seated within the sockets 14, 18 which are of the same configuration. Preferably, the rods 20 are threaded at one end 20', and the sockets 18 formed in the housing outlet tube 10 at that end are internally threaded to facilitate the seating and retaining of the rods within these sockets. The opposite ends of the rods 20 received within sockets 14 are each formed with an annular groove 20" for receiving a common sealing ring 22 applied around all the rods.

Sockets 14 and 18 thus support the rods 20 in the form of a circular array around the housing longitudinal axis 16, with large spaces between the rods providing passageways for the flow of the fluid from the housing inlet 8 through the filter body to the housing outlet 10. The grooved filter discs 4, constituting the filter body 2, are supported in stacked relation on the outer faces of rods 20. For this purpose, the inlet ends of the rods are formed with two annular grooves 24, 26, each receiving a retainer ring 28, 30 for retaining in place an end ring 32 applied around all the rods 20 at one end of the stack of discs 4. The opposite end of the filter disc stack is engaged by a second end ring 34 threadedly applied to the housing outlet tube 10.

Rods 20 support not only the stack of filter discs 4, but also a further ring 36 which is of slightly larger diameter than the filter discs 4 and is disposed between them and end ring 32. Ring 36 is secured to a pair of wire handles 38 extending longitudinally of the filter and terminating in hooks 39 in the general area of the end of housing section 6a. Ring 36 constitutes a stack-retaining member and facilitates the removal of the filter discs 4 without breaking the stack, when housing 6 is opened for cleaning purposes as will be described more particularly below.

The illustrated filter further includes a valve assembly, generally designated 40, mounted to and within rods 20 at the inlet end of the housing. For this purpose, end ring 32 is formed at its outer end with a circular array of holes for receiving the rods 20. At its inner end, ring 32 is integrally formed with a cylinder 42 engaging the inner faces of the rods 20, and with a wall 44 closing the inlet end of the cylinder except for an opening receiving a stem 46 movable therethrough. One end of stem 46 carries a piston 48, constituting a valve member cooperable with a valve opening 49 in the housing inlet tube 8; the opposite end of stem 46 carries a larger-diameter piston 50 which divides the interior of cylinder 42 into two chambers 51 and 52. Chamber 51 is closed by wall 44, and chamber 52 is closed by a cap 54 threadedly attached to the opposite end of cylinder 42.

Chamber 51, on one side of piston 50, is always connected to the atmosphere via port 56, a tube 58, and port 60 in the outer housing section 6a. Chamber 52, on the opposite side of piston 50, serves as a control chamber for controlling piston 50, and thereby piston 48. For this purpose, stem 46 is formed with a radial bore 64 leading into chamber 52, and with an axial bore 66 connected by a tube 68 to a pilot valve, generally designated 70, which may be used for actuating piston 48 either to the illustrated open position with respect to valve opening 49, or to a closed piston against the valve opening to a terminate the flow through the filter.

Pilot valve 70 is more particularly illustrated in FIG. 3. It includes a housing 72 secured within an opening formed in the housing inlet tube 8. The inner end of housing 72 is formed with a connector 74 for receiving tube 68 connected to stem 46 of the valve assembly 40. The outer end of housing 72 receives a control member in the form of a rotatable knob 76 projecting externally of the filter housing inlet tube 8, but having a stem 78 passing through it and terminating in a small piston 80 at the inner end of the pilot valve housing 72. Stem 78 is further formed with an axially-extending bore 82 terminating in a radially-extending bore 84 adapted, in the illustrated inner position of knob 76, to be aligned with a bore 86 in connector 74, which thereby connects chamber 52 to the atmosphere. However, knob 76 may be manually rotated to an outer position wherein piston 80 is moved inwardly past bore 86, whereby the latter bore then communicates with the inlet pressure via bore 88 previously occupied by piston 80. In the latter position of knob 76, chamber 52 is connected to the inlet pressure; this closes valve piston 48 as will be described more particularly below.

The filter illustrated in FIGS. 1-3 operates as follows:

Assuming control member 76 of pilot valve 70 is in the illustrated upper position, chamber 52 of valve assembly 40 is at atmospheric pressure via bores 64 and 66 of the valve assembly 40, and bores 86 and 82 of the pilot valve 70. Since chamber 51 at the opposite side of piston 50 is also at atmospheric pressure (via ports 56 and 60), the net pressure applied on opposite sides of piston 50 is zero. However, piston 48 receives the water inlet pressure and is therefore moved to the illustrated open position of the valve assembly 40.

In this open condition of valve assembly 40, the water inletted via inlet tube 8 is constrained to flow by piston 48 through the spaces between the steel rods 20 to the outer face of the stack of filter discs 4, through the stack, through the spaces between the rods at the inner face of the stack, and then out through the outlet tube 10.

Now, whenever it is desired to clean the filter or otherwise to close the flow through it, this can easily be done by manually rotating control knob 76 of pilot valve 70 to move it outwardly of housing 72 such that piston 86 moves inwardly of housing 70 past bore 86. When this occurs, bore 86 no longer commmnicates with the atmosphere via bore 82, but rather communicates with the inlet pressure via bore 88 previously occupied by piston 80; thus, the inlet line pressure is applied to chamber 52 via bores 88 and 86 of the pilot valve 70, and bores 66 and 64 of the valve assembly 40. Chamber 51 on the opposite side of piston 50 remains connected to the atmosphere via ports 56 and 60, so that a net force is now applied by the inlet pressure in chamber 52 tending to move piston 50, and thereby piston 48, rightwardly towards valve opening 49. This force is opposed by the inlet pressure applied to piston 48, but the cross-sectional area of the latter piston is less than that of piston 50 so that the closing force applied by piston 50 is sufficient to move piston 48 against valve opening 49, thereby terminating the flow of the water.

Whenever it is desired to clean the filter, this is done by first rotating control knob 76 of the pilot valve 70 to move valve piston 48 to close the valve in the manner described above. Ring 6c is then removed, and the left (unmounted) housing section 6b is shifted leftwardly to overlie the downstream pipe connected to the outlet 10. End ring 34 is then unthreaded from the housing outlet pipe 10 and is also moved leftwardly over the downstream pipe, thereby freeing the stack of filter discs 4 for removal. The user then grasps hooks 39 of handles 38 and draws the discs 4 outwardly through the open end of housing section 6a, to thereby move them over the outer surface of the steel rods 20 and then over this downstream pipe without breaking the stack. The filter discs may then be rinsed to remove all the dirt particles without danger that some particles may be washed into the outlet pipe 10 which could clog the downstream irrigation devices.

The filter may be conveniently assembled by first threading the steel rods 20 into the threaded sockets 18' of the housing outlet pipe 10, applying the filter discs 4 over the rods 20, attaching the valve assembly 40 to the rods, and the moving the two housing sections 6a, 6b together and securing them by ring 6c, which may be a conventional toggle ring.

It will thus be seen that the filter housing may be opened and its interior cleaned in a very convenient manner and without detaching the filter from the upstream and downstream pipes. It will also be seen that the described filter requires but a few simple parts which can be manufactured and assembled at low cost. Thus, the main structural strength of the filter is provided by the six (or other desired number of) steel rods 20, and therefore the two housing sections 6a, 6b may be of plastic material which can be manufactured in volume and at low cost by injection molding. Further the two housing sections are substantially of the same configuration, thereby manimizing mold costs.

Figure 5:
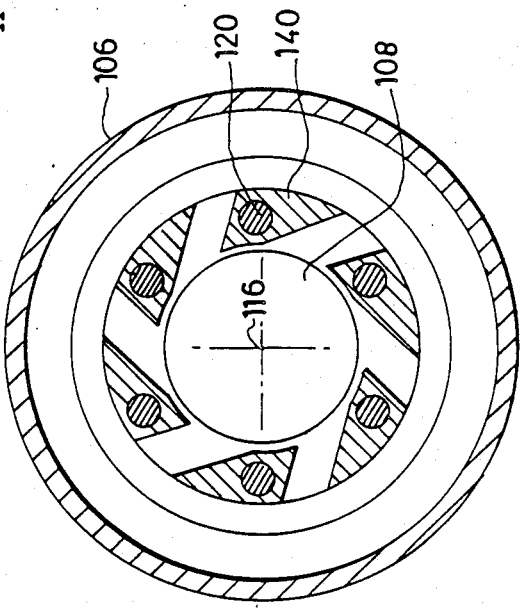
FIG. 5 is a sectional view along lines V—V of FIG. 4.

The filter illustrated in FIGS. 4 and 5 is the same general type as in FIGS. 1–3 above. It also includes a filter body, generally designated 102, constituted of a plurality of grooved filter discs 104, supported in stacked relation within a filter housing, generally designated 106. The latter housing includes two half-sections 106a 106b of generally the same cylindrical configuration, joined together at their inner ends by an annular ring 106c having a seal 107 between them. The outer end of housing section 106a serves as the inlet to the filter and receives an inlet tube 108, and the other end of housing section 106b serves as the outlet from the filter and receives an outlet tube 110. The housing is mounted by a flange plate 112 to a suitable support.

The inlet tube 108 is formed with six circular holes or sockets 114 disposed in a circular array around the longitudinal axis 116 of the filter. A similar circular array of sockets 118 is formed in the outlet tube 110. The two circular array of sockets 114, 118 are used for mounting the opposite ends of six steel rods 120 of cylindrical section. Preferably, rods 120 are threaded at one end 120′; and the sockets 118 formed in the housing outlet tube 110 are internally threaded to facilitate the seating and retaining of the rods within the sockets. The opposite ends of the rods are received within sockets 114 in the inlet tube 108, and are secured by nuts 121 threaded to the ends of the rods and bearing against the mounting flange 112.

Sockets 114 and 118 thus support the rods 120 in the form of a circular array around the housing longitudinal axis 116, with large spaces between the rods providing passageways for the flow of the fluid from the housing inlet 108 through the filter body 102 to the housing outlet 110. The grooved filter discs 114, constituting the filter body 102, are supported in stacked relation on the outer faces of rods 120. For this purpose, the inlet end of each rod is formed with an annular groove receiving a retainer ring 128 for locating an end wall 132 disposed between the filter disc stack and the inlet tube 108. The opposite end of the filter disc stack is engaged by and end ring 134 threadedly applied to the housing outlet tube 110.

Rods 120 support not only the stack of filter discs 104, but also a further ring 136 which is of slightly larger diameter than the filter discs 104 and is disposed between them and end wall 132. Ring 136 is secured to a pair of wire handles 138 extending longitudinally of the filter and terminating in hooks 139 in the general area of the end of housing section 106a. Ring 136 constitutes a stack-retaining member and facilitates the removal of the filter discs 104 without breaking the stack when housing 106 is opened for cleaning purposes, as will be described more particularly below.

End wall 132 is of disc-shape and closes the inlet end of the filter body 102, to thereby direct the fluid, (e.g. irrigating water) inletted through the inlet tube 108 to flow radially outwardly between the rods 120 to the annular space between the outer face of the filter body 102 and the inner face of the housing 106. From there, the fluid flows radially inwardly through the narrow passageways defined by the filter discs 104, the latter separating the particles therein before the fluid is outletted through the outlet tube 118.

End wall 132, at the inlet end of the filter body 102, is provided with six axially-extending sleeves 140 which receive the inlet ends of the six steel rods 120. The outer faces of these sleeves are shaped, as particularly illustrated in FIG. 5, to define deflector surfaces imparting a cyclonic effect to the fluid flowing through the spaces between the sleeves 140 to the annular space between the filter body 102 and the inner face of housing 106.

It will thus be seen that the fluid reaching the outer face of the filter body 102 has a cyclonic flow i.e., substantially tangentially to the outer face of the filter body. This cyclonic flow has been found to sweep along a good portion of the dirt particles in the fluid, which dirt particles settle at the bottom 150 of the filter housing 106. This bottom portion of the filter housing thus acts as a reservoir for accumulating the dirt particles separated from the filter body by the above-mentioned cyclonic-effect. The filter housing is provided with a discharge port 152 communicating with reservoir 150, which discharge port may be connected to a manual valve, a hydraulic valve or the like for periodically purging the dirt particles from the dirt reservoir 150.

In the embodiment of the invention illustrated in FIGS. 4 and 5, the wire handles 138 of the stack-removing ring 136 are disposed inwardly of the filter body 102, rather than outwardly as in FIGS. 1—3. Thus, the handles 138 and ring 136 permit the filter discs to be removed without breaking the stack, in the same manner as in FIGS. 1—3, whenever it is desired to clean the filter, but these handles do not interfere with the cyclonic flow imparted to the fluid by the shaped sleeves 140.

The filter illustrated in FIGS. 4 and 5 otherwise operates in the same manner as FIGS. 1–3, and could also include the valve assembly for controlling the flow through the filter if desired.

Many other variations, modifications, and applications of the invention will be apparent.

What is claimed is:

1. A filter comprising a housing having an inlet and an outlet, and a filter body disposed within said housing for filtering the fluid flowing therethrough from the inlet to the outlet, characterized in that said filter body includes a plurality of grooved filter discs supported in a stack on a plurality of individual rods extending longitudinally of the housing, said rods being supported at their opposite ends by said housing and being disposed in an array around the housing longitudinal axis with spaces between the rods to provide large passageways for the flow of the fluid; each of said grooved filter discs being formed with an opening of a diameter at least as large as the outer diameter of said array of rods for supporting said discs in stack form on said array of rods; the inner faces of said housing at the opposite sides of the filter body being formed with recesses defining individual sockets each of a configuration corresponding to the ends of said rods; the opposite ends of said rods being seated within said sockets.

2. The filter according to claim 1, further including a valve assembly mounted to and within said rods and spaced inwardly of the inlet end thereof and said housing, said valve assembly comprising a valve member movable either to a first position directing the fluid to flow through the spaces between the inlet ends of said rods to the outer face of the filter body and then inwardly through the filter body, or to a second position closing the inlet end of the housing and thereby terminating the fluid flow therethrough.

3. The filter according to claim 2, wherein said valve member is in the form of a valve piston movable within a cylinder fixed to said rods.

4. The filter according to claim 3, wherein said valve member is carried at one end of a stem extending through said cylinder, the opposite end of said stem carrying a second piston constituting a control piston, dividing the interior of the cylinder into a first chamber and a second chamber, said first chamber being continuously vented to the atmosphere, said second chamber being connected to a pilot valve including a control member movable to a first position effective to connect said second chamber to the atmosphere to move the valve piston to its first, valve-opening position, said control member of the pilot valve being movable to a second position effective to connect said second chamber to the housing inlet and thereby to move the valve piston to its second, valve-closing position.

5. The filter according to claim 4, wherein said control member is manually movable and is carried externally of the filter housing so as to be manipulatable externally thereof.

6. The filter according to claim 1, wherein said rods are each of cylindrical section and are disposed in a circular array around the housing longitudinal axis.

7. The filter according to claim 1, further including a stack-removing member disposed at one end of said stack of filter discs, and a handle secured to said stack-removing member to facilitate drawing the filter discs out of the filter housing, when opened for cleaning purposes, without breaking the stack.

8. A filter comprising a housing having an inlet and an outlet, and a filter body including a plurality of grooved filter discs supported in stacked relation within said housing, characterized in that said housing further includes a stack-removing member disposed at one end of said stack of filter discs, and a handle secured to said stack-removing member to facilitate drawing the filter discs out of the filter housing, when opened for cleaning purposes, without breaking the stack.

9. The filter according to claim 8, wherein the inlet of the housing includes shaped deflector surfaces imparting a cyclonic effect to the fluid flowing therethrough to the filter body.

10. The filter according to claim 9 wherein said shaped deflector surfaces are formed in sleeves serving as sockets for receiving one end of said rods.

11. The filter according to claim 10, wherein said sleeves are integrally formed with a deflector disc deflecting the inlet fluid to an annular space around the filter body.

12. The filter according to claim 8, wherein said stack-removing member is a circular ring.

13. The filter according to claim 8, wherein said housing includes two half-sections of substantially the same cylindrical configuration joined at their centers by an annular locking ring.

14. The filter according to claim 8, wherein said handle of the stack-removing member is disposed inwardly of said filter discs.

15. The filter according to claim 8, wherein the lower end of said housing includes a reservoir for accommodating dirt particles separated from the filter body, and an outlet for purging said reservoir.

* * * * *